(12) United States Patent
Odaohhara (10) Patent No.: US 7,948,212 B2
(45) Date of Patent: May 24, 2011

(54) BATTERY PACK AND CHARGING METHOD (75) Inventor: Shigefumi Odaohhara, Yamato (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 518 days.

(21) Appl. No.: 12/167,639

(22) Filed: Jul. 3, 2008

(65) Prior Publication Data
US 2009/0058370 A1 Mar. 5, 2009

(30) Foreign Application Priority Data
Aug. 28, 2007 (JP) .................. 2007-220904

(51) Int. Cl.
*H02J 7/04* (2006.01)
*H02J 7/00* (2006.01)
(52) U.S. Cl. .............. 320/150; 320/128; 320/138
(58) Field of Classification Search .......... 320/150, 320/128
See application file for complete search history.

(56) References Cited

U.S. PATENT DOCUMENTS

| 5,576,608 A * | 11/1996 | Nagai et al. | 320/159 |
|---|---|---|---|
| 5,900,717 A * | 5/1999 | Lee | 320/150 |
| 7,474,079 B2 * | 1/2009 | Hashimoto | 320/138 |
| 2008/0024089 A1 * | 1/2008 | Meng et al. | 320/128 |

FOREIGN PATENT DOCUMENTS

| JP | 08-106926 | 4/1996 |
|---|---|---|
| JP | 11-164489 | 6/1999 |
| JP | 11-191932 | 7/1999 |
| JP | 11-318035 | 11/1999 |
| JP | 2002-017050 | 1/2002 |
| JP | 2004-196165 | 10/2004 |
| JP | 2006-288150 | 10/2006 |

* cited by examiner

*Primary Examiner* — Edward Tso
*Assistant Examiner* — M'Baye Diao
(74) *Attorney, Agent, or Firm* — John L. Rogitz (57) ABSTRACT

In a battery pack with battery charger, a circuit derives a relatively low constant current from the charge current of the battery charger, and this relatively low constant current is used to charge the battery pack when temperature is below a threshold. Otherwise, the charge current from the battery charger is used, at least up to a high temperature threshold.

16 Claims, 6 Drawing Sheets

BATTERY PACK AND CHARGING METHOD

This application claims priority from Japanese patent application no. JP2007-220904, filed Aug. 28, 2007.

FIELD OF THE INVENTION

The present invention generally relates to a charging circuit accommodated in a battery pack, and more particularly, to a charging circuit which can stably perform charging while changing the current value of a charging current based on the temperature of a battery cell.

BACKGROUND OF THE INVENTION

In a notebook personal computer (hereinafter, referred to as "note PC" for simply), which is a typical example of a portable or mobile type electronic device, a lithium ion rechargeable battery is generally used. In recent years, a number of battery pack-related fire accidents has been reported, and safety guidelines have been released for safe use of lithium ion batteries by cooperation of BAJ (The Battery Association of Japan) and JEITA (Japan Electronics and Information Technology Industries Association). Safety guidelines may be available from time to time on the associations home pages on the Internet.

SUMMARY OF THE INVENTION

It is evident that when a lithium ion battery is charged with a large charging current at low temperature, lithium ions having moved from a positive electrode to a negative electrode via organic electrolytic solution are reluctant to be absorbed in the negative electrode, resulting in occurrence of deposition of a lithium metal on the surface of the negative electrode. The lithium metal deposited on the surface of the negative electrode does not return to the electrolytic solution as lithium ions. Therefore, when a flow of a large charging current is taken place at a low temperature, the deposited lithium metal will be accumulated on the negative electrode, thereby increasing a possibility that the positive electrode and the negative electrode are short-circuited. Therefore, when charging is performed at a low temperature, it is necessary to maintain the charging current at a level equal to or smaller than the maximum charging current value Imax2, in order to prevent lithium metal deposition on the negative electrode.

On the other hand, when the lithium ion battery is charged at a high temperature, the temperature of a battery cell increases with an increase in the charging current. Moreover, the ambient temperature in the battery pack is added to the battery cell temperature, and as a result, the surface temperature of the battery cell exceeds an upper limit thereof, which may put the battery pack into a critical condition or may operate a safety circuit of the battery pack so as to stop the charging. Therefore, when charging is performed at a high temperature, it is necessary to maintain the charging current at a level equal to or smaller than the maximum charging current value Imax2, in order to suppress a rise in the temperature of the battery cell.

Figure 6A:
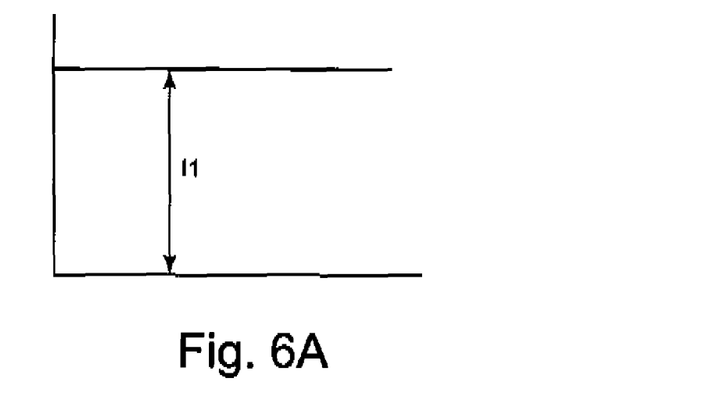
FIGS. 6A to 6C are diagrams illustrating the waveforms of a DC current.
Figure 6B:
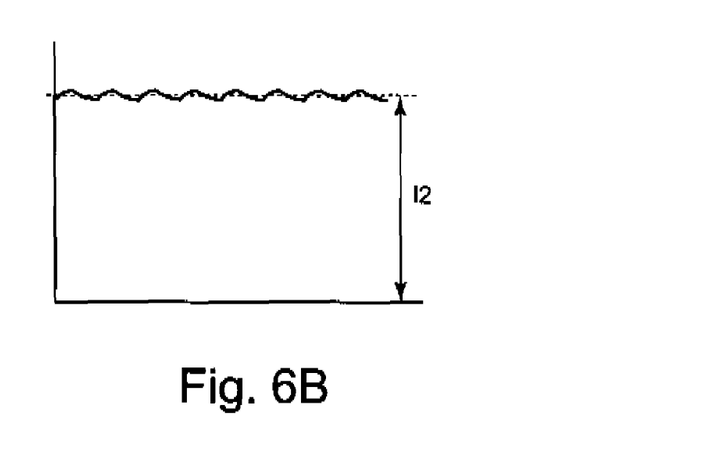
Figure 6C:
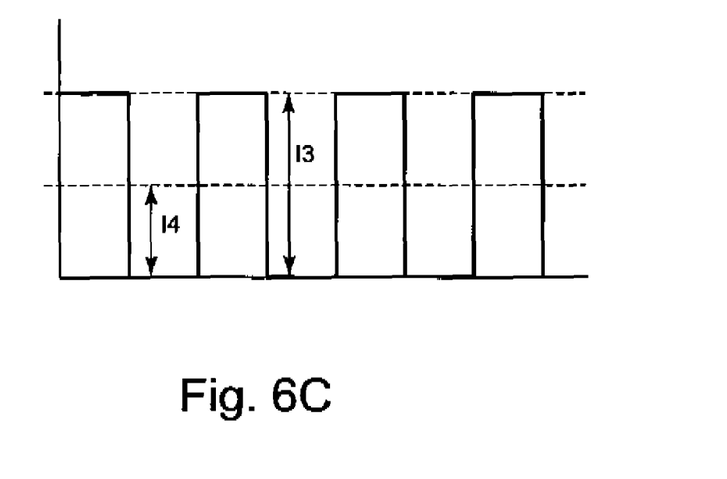

FIGS. 6A to 6C show typical waveforms of a DC current. FIG. 6A shows a waveform of a pure DC current without any AC component, and in this case, the current value can be identified as I1. The DC current having such a waveform may be generated by using the constant current characteristics of a transistor or may be generated as an output current of a battery. FIG. 6B shows a waveform of a charging current generated by a general battery charger which is operated by a switching control method. The battery charger switches or chops an input DC current at a high frequency and smooths the current in an off period by using a smoothing circuit, thereby generating the charging current. Therefore, an AC component of the charging current is small and, the difference between the peak value and the average value thereof is extremely small. The magnitude of the charging current can be identified as the average value I2.

FIG. 6C shows a waveform of a DC current having a magnitude of I3 when it is periodically interrupted with a duty ratio of 50 percents. The DC current has an average value of I4 and a peak value of I3, and the difference between the average value I4 and the peak value I3 is large. In the present description of the specification, the DC current having the waveforms shown in FIGS. 6A and 6B will be referred to as a constant current, and the DC current having the waveform shown in FIG. 6C will be referred to as a switching current. Although either the constant current shown in FIG. 6B or the switching current shown in FIG. 6C contains an AC component because the currents are generated by periodically interrupting the DC current, the switching current differs from the constant current in that the switching current is generated without passing through the smoothing circuit. The switching current may flow even in an off-period due to an inductive component or a capacitive component of the circuit when the frequency increases. However, when the frequency decreases, the switching current becomes substantially zero in the off-period as shown in FIG. 6C and it becomes an intermittent current. In the present specification, the magnitude of the switching current will be represented by an average value I4.

A note PC having mounted thereon a battery pack of a lithium ion battery is equipped with a battery charger of the type having an operation under a constant-current/cons ant-voltage mode and thus, the battery charger is operable to output a constant current identical to a setting current value when performing a constant current control. Hitherto, no one has ever tried to limit the maximum charging current of the lithium ion battery based on the surface temperature of the battery cell and therefore, the battery charger mounted on the note PC is adapted to operate with a single setting current value. However, with the release of the safety guidelines described above, it is necessary to further strengthen the safety management of the lithium ion battery. In this regard, it is necessary to ensure the safety of a battery pack mounted on the note PC which was already shipped in accordance with the safety guidelines. Replacing the battery charger mounted on the shipped note PC with a new battery charger capable of operating with a plurality of setting current values may be a possible option to meet the safety requirement; however, this option has practical difficulties in matters including cost, replacing time, and a problem of design adaptability.

To solve the described problem, a method may be considered in which a new charging circuit is incorporated in the battery pack as described in Patent Documents 1 and 2, so that charging can be performed with the charging current values corresponding to the respective temperature ranges by means of the charging circuit. However, when the charging circuit, which is operated in the constant-current/constant-voltage system, similar to that mounted on the note PC, is provided in the battery pack, it may increase the size of the battery pack, and as a result, the battery pack cannot be mounted on the existing note PC. Moreover, it is necessary to switch a DC voltage at a high frequency in order to generate a constant current through switching control. However, when a switching element operating at a high frequency is provided in the battery pack, it may cause electromagnetic disturbance, leading to malfunction of processors or temperature rise due to heat generation.

In addition, a method can be considered in which a charging circuit capable of operating in both a low temperature range and a high temperature range is provided in a battery pack. Since lithium metal is disadvantageously deposited in the low temperature range, it is necessary for the charging circuit to control the charging current so as not to exceed the maximum charging current value Imax2. Therefore, in order to perform charging with the switching current in the low temperature range, the peak value of the switching current should be no more than the maximum charging current value Imax2. Moreover, in order to generate the switching current from the charging current supplied by the battery charger, the output current (constant current) of the battery charger should be not more than the maximum charging current value Imax2. In a standard temperature ranges the battery charger supplies a much greater charging current within an allowable range of the maximum charging current value Imax1. In such a case, however, the battery charger should be able to set therein at least two charging current values; therefore, this method cannot cope with the shipped note PC.

Moreover, since the difference between the average value and the peak value of the switching current is large, when the peak value is made identical to the maximum charging current value Imax2, the electric power used in actual charging, defined by the average value, becomes smaller, which may increase the charging time, and it is not practical. Moreover, FETs or bipolar transistors may be used as described in Patent Documents 1, and 2. However, when the FETs or the bipolar transistors are operated by a constant current control method in a continuous (constant current) manner rather than a switching manner, a large amount of heat will be generated. Therefore, it cannot be employed in a battery pack which requires strict safety management.

A non-limiting object of some embodiments is to provide a battery pack having accommodated therein a charging circuit capable of changing the value of a charging current based on the temperature associated with a battery cell. Another object of some embodiments is to provide a battery pack capable of increasing an internal temperature when performing charging in a low temperature range to reach a standard temperature range in a short time. A further object of some embodiments is to provide a battery pack having accommodated therein a charging circuit capable of performing charging with a plurality of charging current values without adding any modifications to an apparatus on which the battery pack is mounted. A still further object of some embodiments is to provide a method of charging a secondary battery accommodated in a battery pack based on a temperature associated with a battery cell.

A battery pack according to some embodiments can be charged with a charging current supplied by a DC power supply. The battery pack may include a temperature element configured to measure a temperature associated with a secondary battery, a first charging circuit, and a control unit. The first charging circuit may generate a constant current from the charging current. The control unit may control the operation of the battery pack in a manner such that the secondary battery is charged with the constant current lower than the charging current by the first charging circuit when it is determined that the temperature in connection with the secondary battery belongs to a low temperature range, while the secondary battery is charged by the DC power supply when it is determined that the temperature in connection with the secondary battery belongs to a standard temperature range higher than the low temperature range. The temperature in connection with the secondary battery may be a temperature suitable for monitoring the temperature of a battery cell and capable of being measured on the surface of a housing of the battery cell or being directly measured in the inside of the battery cell or being indirectly at a position distant from the battery cell.

Even when the DC power supply is a battery charger that operates with a single setting current, the first charging circuit on the battery pack side can generate a charging current as needed depending on the temperature of the battery cell and perform charging. When the first charging circuit generates the charging current by continuously controlling semiconductor elements, heat may generate from the semiconductor elements; however, in some embodiments, the heat generation is used to ensure safety. Specifically, by operating the first charging circuit only when the temperature of the battery cell belongs to the low temperature range, it is possible to increase the temperature of the battery cell in a short period of time to thusly prevent lithium metal from depositing. Moreover, after the temperature of the battery cell is increased to the standard temperature range in a short period of time, the charging can be performed with the maximum charging current allowed in the standard temperature range; therefore, it is possible to decrease the charging time.

The battery pack may further include a second charging circuit. The second charging circuit can generate a switching current lower than the charging current from the charging current per se. In this case, the control unit may control the operation of the battery pack in a manner such that the secondary battery is charged by the second charging circuit when it is determined that the temperature in connection with the secondary battery belongs to a high temperature range higher than the standard temperature range. The value of the switching current can be represented by the average values and the difference between the average value and the peak value may be relatively large. However, since in the high temperature range, it is only necessary to prevent any temperature rise in the battery, the charging can be performed with the switching current generated with a duty ratio that satisfies the average value determined based on the temperature rise. Moreover, since the cycle of the switching operation can be extended to a range necessary for preventing the temperature rise, there is no problem of heat generation or electromagnetic disturbance due to the switching operation.

The first charging circuit may be configured by using the constant current characteristics of the collector current relative to the base current in the bipolar transistor or the drain current relative to the gate current in the field-effect transistor. The second charging circuit may be provided for protection of the battery pack and can be configured as a charge protection switch which is typically installed to inhibit charging to the secondary battery. The peak value of the switching current generated by controlling turning on/off of the charge protection switch can become identical to the value of the charging current supplied by the DC power supply; however, it does not cause any problem to the charging in the high temperature range as described above. When the secondary battery is a lithium ion battery, although it is usually particularly difficult to limit the charging current relative to the temperature of the battery cell, such a difficulty can be eliminated by present principles.

In accordance with some embodiments, even when the DC power supply is a battery charger that is operated with a single setting current, the secondary battery can be charged with the charging current as needed depending on the temperature of the battery cell by only the components accommodated in the battery pack. Therefore, a shipped apparatus equipped with a battery charger that is operated with a single setting current can be charged with a plurality of setting current values in accordance with the temperature of the battery cell without necessity of applying any modifications to the battery charger. When the DC power supply is a battery charger which is operated by a constant-current/constant-voltage control node, the charging is performed by the first or second charging circuit during only the constant current control period, which the charging can be performed by the battery charger when the charging mode of the secondary battery enters a state wherein it switches to a constant voltage control mode. The state wherein it switches to the constant voltage control mode can be determined by the charging current or the charging voltage. Since the constant voltage control requires strict voltage management, it is desirable to perform the charging by means of the battery charger. Even when the charging mode wherein charging is performed by means of the first or second charging circuit is switched to a constant voltage control mode wherein charging is performed by means of the battery charger, the charging current is decreased to a value not more than the maximum charging current value Imax2 that is allowed in the temperature ranges.

When the temperature of the battery cell belongs to the standard temperature range during charging by the first or second charging circuit, the charging can be performed by the battery charger, whereby the charging current is not limited to more than that needed, and the charging time is not increased. When the temperature of the battery cell belongs to the high temperature range while the charging is performed by means of the battery charger, the charging can be continued by the second charging circuit without necessity of stopping the charging. When the voltage of the secondary battery has reached the maximum charging voltage that is allowed in the low temperature range or the high temperature range while charging is still being performed by the first charging circuit or the second charging circuit, the charging can be stopped and therefore, the safety can be ensured.

In accordance with the above-mentioned various aspects of present principles, it is possible to provide a battery pack having accommodated therein a charging circuit capable of changing the current value of a charging current based on the temperature in connection with a battery cell. Further, it is possible to provide a battery pack capable of increasing an internal temperature when performing charging in a low temperature range to reach a standard temperature range in a short period of time. Furthermore, it is possible to provide a battery pack having accommodated therein a charging circuit capable of performing charging with a plurality of charging current values without adding any modifications to an apparatus on which the battery pack is mounted. Furthermore, it is possible to provide a method of charging a secondary battery accommodated in a battery pack based on the temperature associated with the secondary battery.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
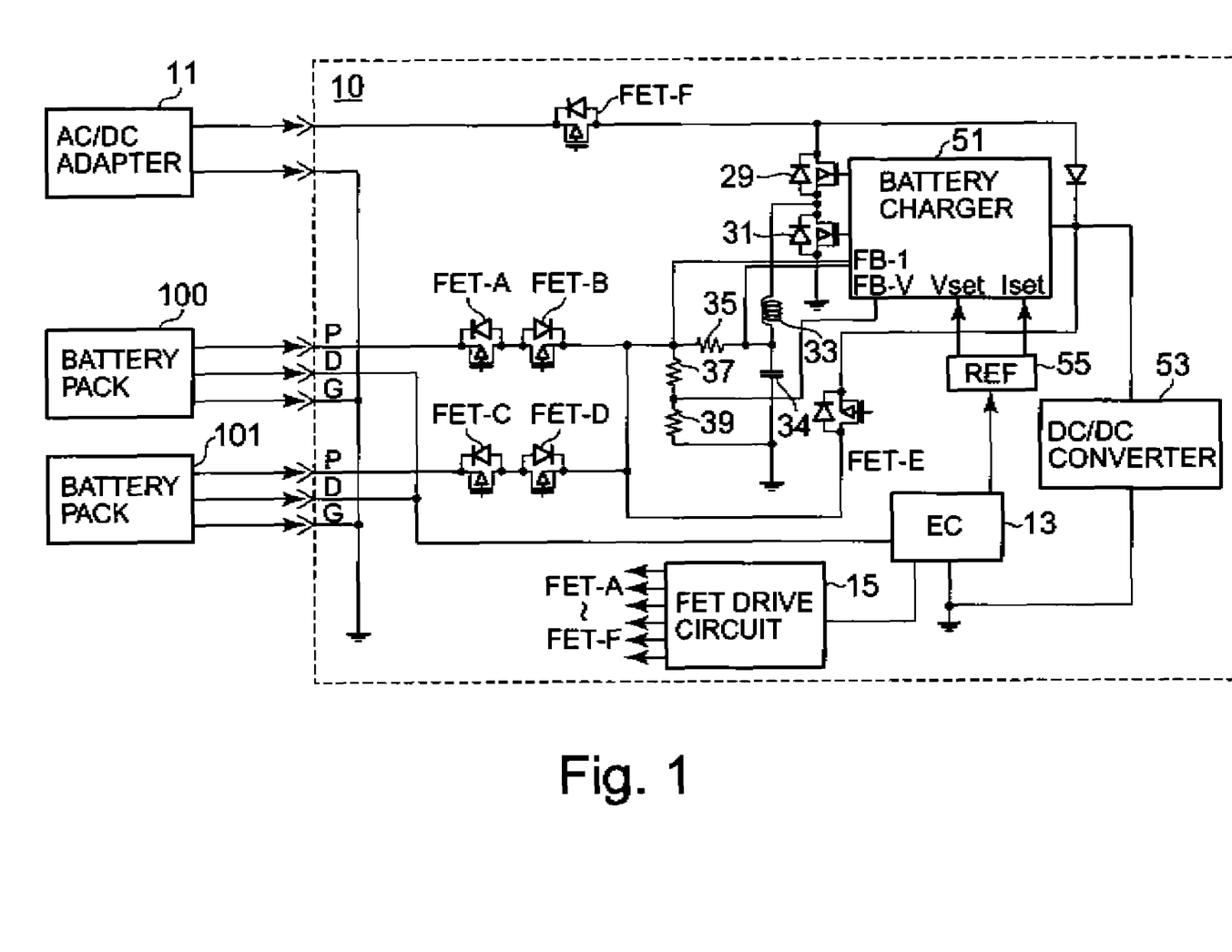
FIG. 1 is a block diagram illustrating an outline of a charging system including a battery pack according to a non-limiting example implementation of the present invention and a note PC having mounted thereon the battery pack.

FIG. 1 is a block diagram illustrating an outline of a charging system including an example battery pack according to present principles and a note PC having mounted thereon the battery pack. The charging system includes a note PC 10, an AC/DC adapter 11, and battery packs 100 and 101. The battery pack 100 is used as a main battery pack, and the battery pack 101 is used as an auxiliary battery pack. The battery pack 100 and the battery pack 101 may have the same construction in example embodiments of the present invention; however, the charging system may be constructed by only the battery pack 100 in a state where the battery pack 101 is not mounted thereon. The note PC 10 is illustrated with only those elements that are related to present principles. The AC/DC adapter 11 is configured to be connectable to a power supply line of the note PC 10, and the battery packs 100 and 101 are removably accommodated in a battery bay of the note PC 10. The AC/DC adapter 11 converts an AC voltage to a DC voltage.

The discussion below pertains to an example non-limiting implementation. In non-limiting examples the battery charger 51 has constant-current/constant-voltage characteristics, and a charging rate thereof is fixed to about 0.7 C so that it can perform its fast charging capability. Therefore, the battery charger 51 is not operable with a plurality of charging rates. The battery charger 51 includes a switching control circuit that controls turning on/off of an FET 29 and an FET 31 in a PWM method and a smoothing circuit composed of an inductor 33 and a capacitor 34. The battery charger 51 converts a DC voltage input from the AC/DC adapter 11 to a DC voltage suitable for charging the battery pack and outputs the converted voltage. The battery charger 51 suppresses the pulsation of the DC charging current generated through the switching control circuit by using the smoothing circuit to thereby generate a constant current. To the voltage feedback input FB-V and the current feedback input FB-I of the battery charger 51, voltage-dividing resistors 37 and 39 and an output from the current sense resistor 35 are connected respectively, and voltages corresponding to the output voltage (charging voltage) and output current (charging current) of the battery charger 51 are input for feedback control.

To a current setting value input Iset and a voltage setting value input Vset of the battery charger 51, voltages from a reference voltage source 55, which are divided from a constant voltage generated within the note PC 10 are input. The reference voltage source 55 inputs the setting voltage Vchg to the voltage setting value input Vset and the setting current Ichg to the current setting value input Iset in accordance with instructions from an embedded controller (EC) 13. The battery charger 51 is operated such that the output voltage or the output current is identical to either the setting voltage Vchg or the setting current Ichg. Although the battery charger 51 is operated in a constant current control mode in an initial period of charging, when the charging current decreases and becomes lower than the setting current Ichg with the progress of the charging, the battery charger 51 is automatically operated in a constant voltage control mode so that the output voltage is identical to the setting voltage Vchg. To the contrary, when due to some reasons, the charging voltage is decreased to be lower than the setting voltage Vchg during operation in the constant voltage control mode, the battery charger 51 is automatically operated in a constant current control mode so that the output current is identical to the setting current Ichg.

The EC 13 is an integrated circuit that controls many hardware elements of the note PC 10 as well as a power supply. The EC 13 can communicate with the battery packs 100 and 101 to thereby acquire information such as the surface temperature, battery voltage, charging current, charging power, discharging power, and remaining capacity of the battery cell generated by the battery packs 100 and 101 and the setting voltage Vchg and setting current Ichg set by the battery charger. The EC 13 delivers instructions to the reference voltage source 55 to activate or stop the battery charger 51 in accordance with the instruction from the battery packs 100 and 101. For example, when the EC 13 is instructed by the battery packs to set the setting voltage Vchg and the setting current Ichg to zero, values of zero are programmed to the voltage setting value input Vset and the current setting value input Iset, and the operation of the battery charger 51 is stopped. When the battery charger 51 starts an operation, the EC 13 having received the instructions from the battery packs 100 and 101 programs the setting voltage Vchg and the setting current Ichg to the voltage setting value input Vset and the current setting value input Iset.

A DC/DC converter 53 converts the DC voltage supplied from the AC/DC adapter 11 or the battery packs 100 and 101 to a predetermined voltage and supplies the converted voltage to a device in the note PC 10. Examples of the device include a variety of devices such as a CPU, a liquid crystal display, a wireless module, a hard disc drive, or a controller. An FET-A and an FET-B are switches for controlling charging/discharging of the main battery pack 100 and are connected to a charging/discharging circuit of the main battery pack 100. An FET-C and an FET-D are switches for controlling charging/discharging of the auxiliary battery pack 101 and are connected to a charging/discharging circuit of the auxiliary battery pack 101.

An FET-E is a switch that is connected between the battery packs 100 and 101 and the DC/DC converter 53 for forming a discharging circuit from the battery packs 100 and 101 to the DC/DC converter 53. An FET-F is connected to a circuit for supplying electric power from the AC/DC adapter 11 to the DC/DC converter 53. That is, the FET-F is a switch for temporarily supplying electric power from the battery packs 100 and 101 to the DC/DC converter 53 in order to perform so-called peak shifting wherein the switch suppresses the peak of an AC power source by interrupting the supply of electric power from the AC power source while electric power is being supplied from the AC/DC adapter 11 to the DC/DC converter 53. An FET drive circuit 15 controls the FET-A to the FET-F in accordance with the instructions from the EC 13.

Figure 2:
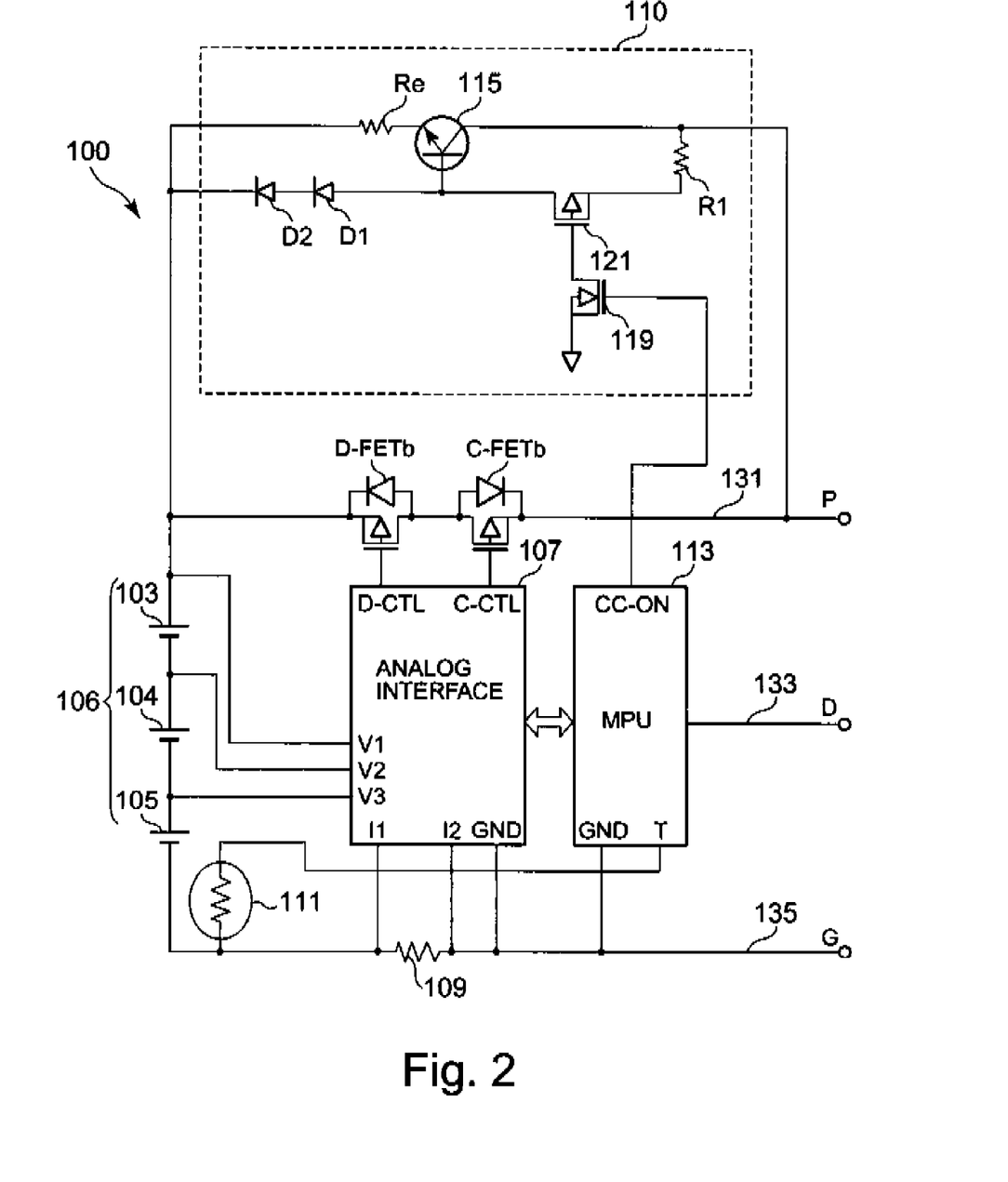
FIG. 2 is a block diagram illustrating an example of the battery pack according to one embodiment.

FIG. 2 is a block diagram illustrating an internal construction of the battery pack 100 in compliance with the smart battery system (SBS) standards according to an example embodiment. The battery pack 101 has the same construction as the battery pack 100. The battery pack 100 has a power supply line 131, a communication line 133, and a ground line 135, which are respectively connected to a P terminal, a D terminal, and a G terminal of the note PC 10. To the power supply line 131, a charge protection switch C-FETb and a discharge protection switch D-FETb, which are configured by p-type MOS-FETs, are connected in series. To the discharge protection switch D-FETb, a battery set 106 having therein three lithium ion battery cells 103 to 105 are connected in series. The discharging current from the battery set 106 and the charging current to the battery set 106 flows between the note PC 10 and the battery set 106 via a charging/discharging circuit formed by the power supply line 131 and the ground line 135.

The terminals of the battery set 106 at the voltage side of the battery cells 103 to 105 are connected to analog input terminals V1 to V3 of an analog interface 107. A temperature element 110 such as one or plural thermistors is attached on the surface of the battery set 106. The output of the temperature element 110 is connected to a T terminal of an MPU 113. A current sense resistor 109 is connected to the ground line 135 between the negative terminal and the G terminal of the battery cell 105. Both ends of the current sense resistor 109 are connected to the I1 and I2 terminals of the analog interface 107.

The analog interface 107 includes analog input terminals V1, V2, and V3 for acquiring the respective cell voltages of the battery cells 103 to 105 and analog input terminals I1 and I2 for acquiring potential difference across the current sense resistor 109. The analog interface 107 also includes analog output terminals C-CTL and D-CTL for outputting signals that control turning on/off of the charge protection switch C-FETb and the discharge protection switch D-FETb. The analog interface 107 measures the cell voltages of the battery set 106, converts the measurement values into digital values, and delivers the converted values to the MPU 113.

The analog interface 107 measures the charging current and the discharging current flowing in the battery set 106 from the voltage detected by the current sense resistor 109, converts the measurement values into digital values, and delivers the converted values to the MPU 113. The MPU 113 is an integrated circuit in which in addition to an 8 to 16 bit CPU, a RAM, a ROM, a flash memory, and a timer are integrated into one package. The MPU 113 is configured to be able to communicate with the analog interface 107, and calculates the amount of charged or discharged electricity based on the voltage or current measurement values delivered from the analog interface 107. Moreover, the MPU 113 has an overcurrent protection function, an overvoltage protection function (also referred to as overcharge protection function), and an undervoltage protection (also referred to as overdischarge protection function). Upon detection of an abnormality in the battery cells 103 to 105 from the voltage or current measurement value delivered from the analog interface 107, the MPU 113 turns off either or both of the charge protection switch C-FETb and the discharge protection switch D-FETb via the analog interface 107. The overcurrent protection function, the overvoltage protection function, and the undervoltage protection function are implemented as a program that is executed by the MPU 113.

The communication line 133 from the MPU 113 is connected to the EC 13 of the note PC 10 via the D terminal, so that the MPU 113 can communicate with the EC 13. A clock line is included in the communication line 133. The MPU 113 transmits the values of the setting current Ichg and the setting voltage Vchg, which are to be programmed in the battery charger 51 to the EC 13. Then, the EC 13 programs the setting values into the battery charger 51 via the reference voltage source 55 to thereby activate or stop the operation of the battery charger 51.

An npn-type bipolar transistor 115 is connected to the power supply line 131 in parallel to the series connection of the discharge protection switch D-FETb and the charge protection switch C-FETb. A resistor R1 and an FET 121 are connected in series between the collector and the base of the transistor 115. An FET 119 is connected between the gate of the FET 121 and the ground line 135, and the gate of the FET 119 is connected to a CC-ON terminal of the MPU 113. The transistor 115 has the emitter connected to one end of a resistor Re and the base connected to a series connection of diodes D1 and D2. The other end of the resistor Re and the cathode of the diode D2 are connected to the positive electrode of the battery cell 103. The transistor 115 and the resistors, diodes, and FETs that operate the transistor 115 form a constant current circuit 111 for charging the battery set 106 in the low temperature range. The charge protection switch C-FETb is usually used for stopping the charging when the MPU 113 has detected an abnormality as to the charging voltage or charging current in the interior of the battery pack 100. However, in the present embodiment, the charge protection switch C-FETb is also used for charging the battery set 106 in the high temperature range. It is to be noted that the transistor 115 may be a pnp-type bipolar transistor.

Next, a charging operation of the constant current circuit 111 to the battery set 106 will be described. The transistor 115 generates a constant current when the battery pack 100 is operated by being supplied with the charging current from the battery charger 51 of the note PC 10. When the MPU 113 determines from the temperature detected by the temperature element 110 that the surface temperature of the battery cells 103 to 105 belongs to a low temperature range, the MPU 113 turns off the charge protection switch C-FETb while turning on the FET 119. When the FET 119 is turned on, the FET 121 is turned on and a bias circuit of the transistor 115 is operated. The charging current supplied via the P terminal from the battery charger 51 is supplied to the battery set 106 via the collector and the emitter of the transistor 115.

The diodes D1 and D2 cause a forward voltage drop of about 0.6 V. Since the base-emitter voltage Vbe of the transistor 115 is approximately equal to the forward voltage drop of the diode D1, assuming the resistance value of the resistor Rc be Re, a charging current of I=0.6/Re flows through the collector. If the charging current I increases due to some reasons, the voltage drop at the resistor Re increases and the voltage Vbe decreases. As a result, the base current decreases to suppress the increase in the charging current I. On the other hand, if the charging current I decreases due to some reasons, the voltage drop at the resistor Re decreases and the voltage Vbe increases. As a results the base current increases to suppress the decrease in the charging current I. In this manner, the transistor 115 can output a constant charging current I=0.6/Re. This charging current is the constant current described in FIGS. 6A to 6C, and the value corresponds to the maximum charging current value Imax2.

When the constant current is generated by continuously controlling the transistor 115 rather than controlling it in a switching manner, heat corresponding to 0.6 W to 0.7 W is generated. The upper limit of heat generation in a device accommodated in the battery pack is set to 0.3 W to 0.4 W in order to prevent temperature rise in the battery cell. In this respect, the transistor 115, which is operated in a constant current mode, is not suitable as a device accommodated in the battery pack. However, in the present embodiment, since the transistor 115 is operated only when the surface temperature of the battery cell remains in the low temperature range, the surface temperature of the battery set 103 is not increased to such a dangerous state. On the contrary, the transistor 115 increases the surface temperature of the battery cell in a short time, thereby providing an advantage that it prevents deposition of lithium metal during charging. Moreover, the surface temperature increases to the standard temperature range in a short time, and the charging can be performed with the maximum charging current value Imax1 allowed in the standard temperature range, whereby the charging time can be reduced.

Subsequently, a charging operation of the charge protection switch C-FETb to the battery set 106 will be described. The charge protection switch C-FETb performs a switching operation while the battery pack 100 is being supplied with the charging current from the battery charger 51 of the note PC 10. When the MPU 113 determines from the temperature detected by the temperature element 110 that the surface temperature of the battery cells 103 to 105 belongs to a high temperature range, the MPU 113 turns on the discharge protection switch D-FETb while controlling turning on/off of the charge protection switch C-FETb by setting the duty ratio such that the average value of the charging current supplied by the battery charger 51 becomes the maximum charging current value Imax2 (see FIGS. 6A to 6C). The average value of the switching current flowing in the battery set 106 is measured by the analog interface 107 as the voltage across the current sense resistor 109 and is delivered to the MPU 113. The MPU 113 controls the duty ratio of the charge protection switch C-FETb based on the value in a feedback manner. When the battery charger 51 is operated in a constant current control mode and is outputting a constant current of Imax1, the peak value of the waveform of the switching current flowing in the battery set 106 corresponds to the maximum charging current value Imax1. However, in the high temperature range, unlike the low temperature range, it does not cause any problem if the peak value of the current waveform exceeds the maximum charging current value Imax2. Therefore, when the average value is not more than the maximum charging current value Imax2, it is possible to suppress temperature rise, and the on/off switching cycle can be increased to about several minutes.

When the constant current is generated by a switching operation, it is necessary that the switching frequency is increased to about 100 KHz or more and that a smoothing circuit is provided. In such a case, in addition to a space problem in the battery pack, there is a fear of electromagnetic disturbance in the operation of the MPU 113; for this reason, up to this far, it was difficult to generate the charging current by the switching operation of the charge protection switch C-FETb. However, in the present embodiment, the charging by means of the charging protection switch C-FETb is performed only when the surface temperature of the battery cells 103 to 105 remains in the high temperature range. Therefore, as long as the switching current is generated such that the surface temperature does not exceed the upper limit temperature, it is possible to maintain the switching frequency at a sufficiently low level. Thus, there is no problem of electromagnetic disturbance or heat generation.

Figure 3:
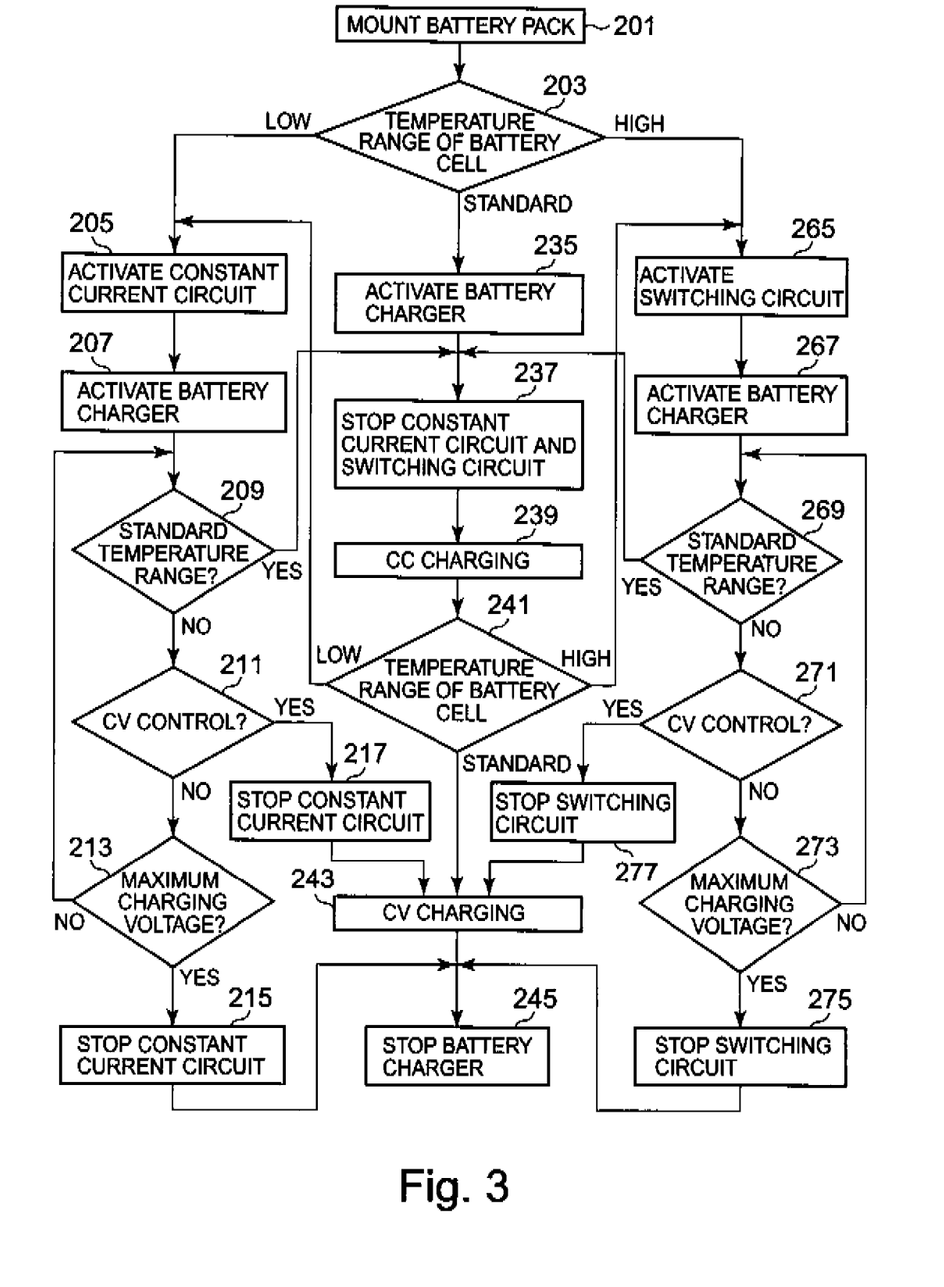
FIG. 3 is a flow chart illustrating non-limiting example procedures of charging the battery pack.
Figure 5A:
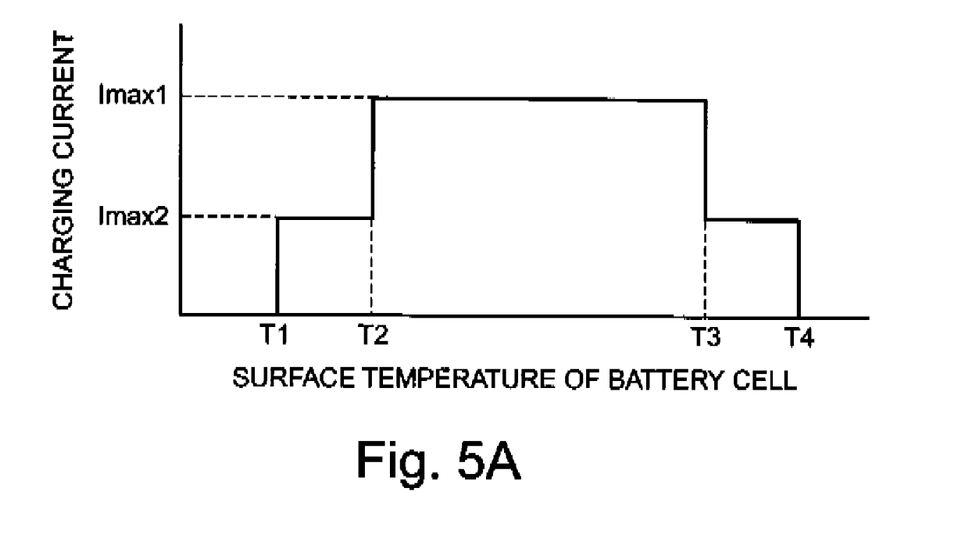
FIGS. 5A and 5B are diagrams illustrating the relationship between the maximum values of the charging voltage and current and the surface temperature of the battery cell.
Figure 5B:
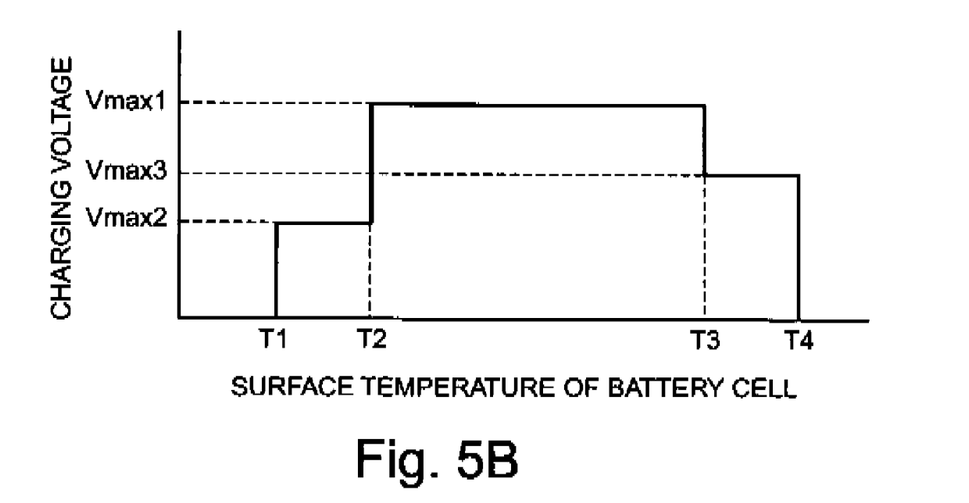

FIG. 3 is a flow chart illustrating the procedures of charging the battery set 106 by means of the charging system shown in FIG. 1 having the battery pack 100 mounted thereon. In block 201, the battery pack 100 is attached to a battery bay of the note PC 10. The MPU 113 measures the voltages of the battery cells 103 to 105 to thereby determine whether or not charging is required. When it is determined that the charging is required, in block 203, the MPU 113 determines from the temperature detected by the temperature element 110 whether the surface temperature of the battery cells belongs to either of the three temperature ranges shown in FIGS. 5A and 5B. In one example embodiment, the maximum value of the charging current is set to 0.3 C in the low temperature range and the high temperature range, while the maximum value of the charging current is set to 0.7 C in the standard temperature range. It is to be noted that the present invention is not limited to the three example temperature ranges illustrated and that the setting value of the charging current in each temperature range is not limited to these values.

In block 203, when the MPU 113 determines that the surface temperature of the battery cells 103 to 105 belongs to the low temperature range, in block 205, the MPU 113 turns off the charge protection switch C-FETb while turning on the FET 119 to thereby activate the bias circuit of the transistor 115. Subsequently, in block 207, the MPU 113 issues a charge request by instructing the EC 13 to set the setting current Ichg and the setting voltage Vchg in the battery charger 51. The setting current Ichg is set to a fixed rate of 0.7 C, and therefore, the battery charger 51 outputs a charging current of 0.7 C when it is operated in the constant current control mode. When the setting current Ichg and the setting voltage Vchg are programmed in the current setting value input Iset and the voltage setting value input Vset, the battery charger 51 starts its operation.

In block 209, the transistor 115 is operated in a constant current control mode to thereby generate a constant current of 0.3 C from the constant voltage supplied from the battery charger 51, and therefore, the battery cell, 103 to 105 are charged with the constant current of 0.3 C. The MPU 113 is periodically monitoring the surface temperature of the battery cells 103 to 105 during charging. When it is determined in block 209 that the surface temperature has reached the standard temperature range, the flow proceeds to block 237, where the MPU 113 stops the operation of the transistor 115 and turns on the charge protection switch C-FETb, thereby switching a charging mode to a mode wherein charging is performed by means of the battery charger 51. The charging by means of the battery charger 51 is carried out via a path formed by the P terminal, the charge protection switch C-FETb, the discharge protection switch D-FETb, the battery set 106, the current sense resistor 109, and the G terminal. Since the transistor 115 also functions as a heating element, the battery pack 100 can shorten the time until the surface temperature reaches the standard temperature range from the low temperature range to thereby suppress the deposition of lithium metal. Moreover, since the surface temperature can be shifted from the low temperature range to the standard temperature range in a short time, the charging can be performed with a charging current of 0.7 C by means of the battery charger 51, thereby shortening the charging time.

When it is determined in block 209 that the surface temperature remains in the low temperature range, the flow proceeds to block 211, where the MPU 113 determines based on the values detected by the current sense resistor 109 whether the charging current is decreased to a level at which the battery charger 51 switches to a constant voltage control mode. When it is determined in block 211 that the charging current is decreased up to such a level, the flow proceeds to block 217, where the MPU 113 turns off the FET 119 to stop the operation of the transistor 115, while turning on the charge protection switch C-FETb to thereby switch the charging mode to a mode wherein charging is performed by means of the battery charger 51. When it is determined in block 211 that the charging current is not decreased up to such a level, the flow proceeds to block 213, where the MPU 113 determines whether the charging voltage has reached the maximum charging voltage value Vmax2 in the low temperature range shown in FIG. 5B.

When it is determined in block 213 that the charging voltage has reached the maximum charging voltage value Vmax2, the operation of the transistor 115 is stopped in block 215, and the operation of the battery charger 51 is stopped in block 245, thereby stopping the charging to thereby prevent deposition of the lithium metal. When it is determined in block 213 that the charging voltage has not reached the maximum charging voltage value Vmax2, the flow returns to block 209 to continue the charging by means of the transistor 115.

When the MPU 113 determines in block 203 that the surface temperature of the battery cells 103 to 105 belongs to the standard temperature range, the flow proceeds to block 235, where the MPU 113 issues a charge request to the EC 13 to activate the battery charger 51, and at the same time, in block 237, the MPU 113 stops the operation of the transistor 115 and turns on the charge protection switch C-FETb. In block 239, the battery charger 51 charges the battery set 106 in a constant current control mode with a charging rate of 0.7 C. Since the MPU 113 is monitoring the surface temperature during charging, when it is determined in block 241 that the surface temperature belongs to the low temperature range, the flow proceeds to block 205, while when it is determined that the surface temperature remains in the standard temperature range, the flow proceeds to block 243, and when it is determined that the surface temperature belongs to the high temperature range, the flow proceeds to block 265. When as a result of the progress of charging, the charging current is decreased to a level at which the battery charger 51 cannot be operated in a constant current control mode, in block 243, the battery charger 51 is automatically operated in a constant voltage control mode so that the output voltage is identical to the setting voltage Vchg. When the charging current is decreased to a predetermined value, the operation of the battery charger 51 is stopped in block 245 and the charging is completed.

When the MPU 113 determines in block 203 that the surface temperature belongs to the high temperature range, the flow proceeds to block 265, where the MPU 113 controls turning on/off of the charge protection switch C-FETb with a cycle of several seconds to several minutes by setting the duty ratio such that the average value of the charging current becomes 0.3 C. Subsequently, in block 267, the MPU 113 issues a charge request by instructing the EC 13 to set the setting current Ichg and the setting voltage Vchg in the battery charger 51. The setting current Ichg is set to a fixed rate of 0.7 C, and therefore, the battery charger 51 outputs a charging current of 0.7 C when it is operated in the constant current control mode. When the setting current Ichg and the setting voltage Vchg are programmed in the current setting value input Iset and the voltage setting value input Vset, the battery charger 51 starts its operation.

In block 269, the battery set 106 is charged with a charging current (switching current) having an average value of 0.3 C and a peak value of 0.7 C by the switching operation of the charge protection switch C-FETb. Since there is no problem of deposition of lithium metal in the high temperature range, it does not cause any problem if the peak value exceeds the maximum charging current value Imax2. When it is determined in block 209 that the surface temperature has decreased to the standard temperature range, the flow proceeds to block 237, where the charge protection switch C-FETb stops the switching operation and maintains an on state, whereby the charging mode is switched to a mode wherein charging is performed by means of the battery charger 51. Since the on/off switching cycle of the charge protection switch C-FETb can be increased, the amount of heat generation is small and the temperature rise in the battery pack can be suppressed.

When it is determined in block 269 that the surface temperature remains in the high temperature range, the MPU 113 determines in block 271 whether the charging current is decreased to a level at the battery charger 51 switches to a charging voltage control mode. When it is determined in block 271 that the charging current is decreased tip to such a level, the flow proceeds to block 277, where the charge protection switch C-FETb stops the switching operation and maintains an on state, whereby the charging mode is switched to a mode wherein charging is performed by means of the battery charger 51. When it is determined in block 271 that the charging current is not decreased up to such a level, the flow proceeds to block 273, where the MPU 113 determines whether the charging voltage has reached the maximum charging voltage value Vmax3 in the high temperature range shown in FIG. 5B.

When it is determined in block 273 that the charging voltage has reached the maximum charging voltage value Vmax3, the charge protection switch C-FETb stops the switching operation and maintains an off state in block 275, and then the flow proceeds to block 245, where the operation of the battery charger 51 is stopped to thereby ensure the safety against the temperature rise. When the MPU 113 determines in block 273 that the charging voltage has not reached the maximum charging voltage value Vmax3, the flow returns to block 269, where the charging is continued by means of the switching operation of the charge protection switch C-FETb.

The program for executing the procedures described above is stored in a ROM of the MPU 113. The charging current in the low temperature range or the high temperature range is generated by the constant current circuit or the switching circuit accommodated in the battery pack 100. The information or instructions delivered from the battery pack 100 to the EC 13 are the same as those of the conventional note PC 10 equipped with the battery charger which is operated with a single setting current Ichg. Therefore, the above procedures can be executed by only mounting the battery pack 100 on the note PC 10, which was already shipped, without needing to apply any modifications thereto.

Figure 4:
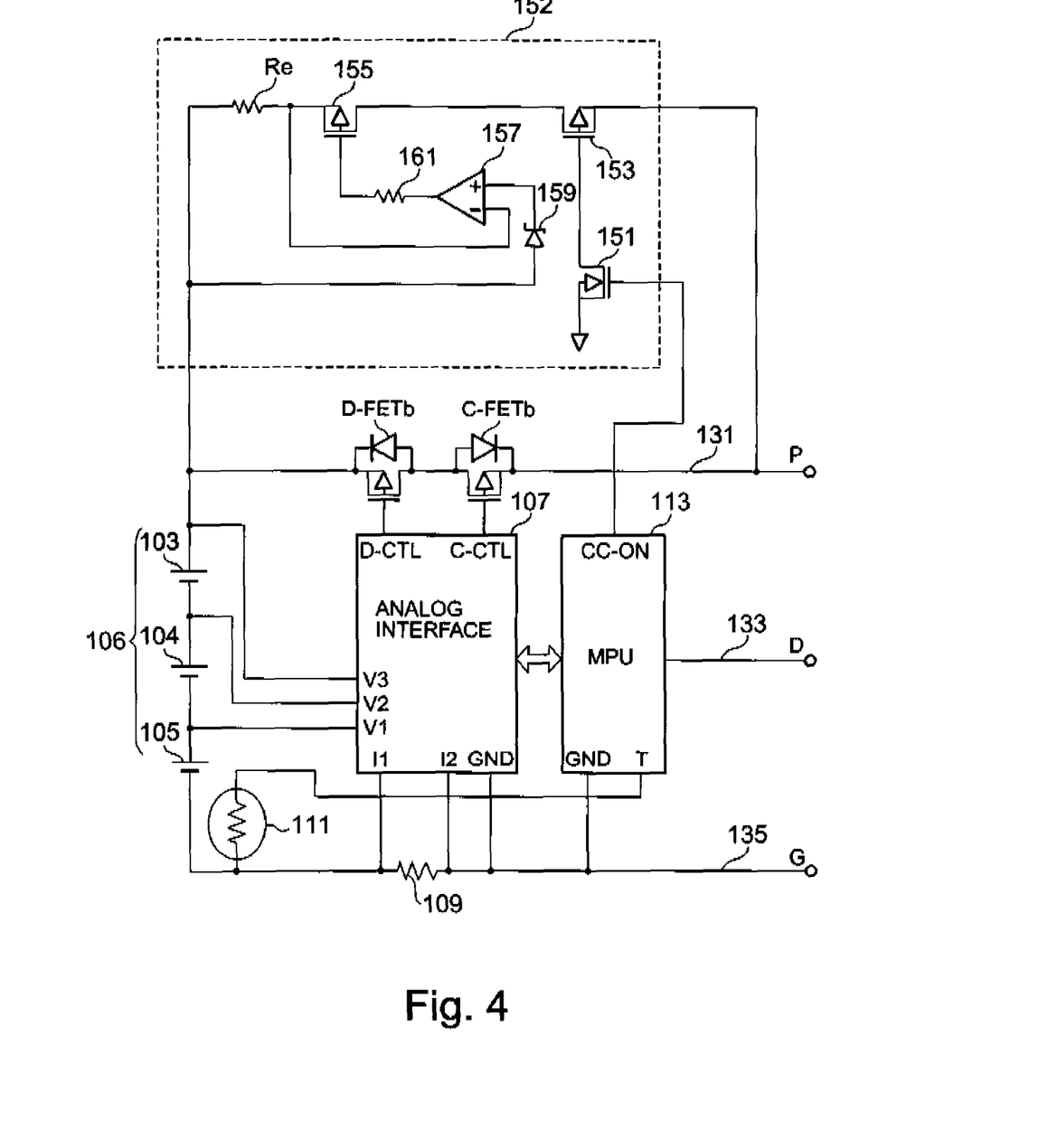
FIG. 4 is a block diagram illustrating another example of the battery pack according to an embodiment.

FIG. 4 is a block diagram of a battery pack, showing another example of the constant current circuit that is operated in a low temperature range. The constant current circuit 152 shown in FIG. 4 is different from the constant current circuit 111 shown in FIG. 2, in that the constant current circuit 111 is mainly configured by the transistor 115 while the constant current circuit 152 uses a p-channel MOS-FET 155, which is an enhancement-type field-effect transistor. An FET 153 has one end thereof connected to the power supply line 131 and the other end connected to the drain of the MOS-FET 155. A current sense resistor Rs has one end thereof connected to the source of the MOS-FET 155 and the other end connected to the positive terminal of the battery cell 103. An FET 151 is connected between the gate of the FET 153 and the ground line 135, and the gate of the FET 151 is connected to the CC-ON terminal of the MPU 113.

The cathode of a zener diode 159 is connected to a plus (+) terminal of an operational amplifier 157, and the anode of the zener diode 159 is connected to a positive terminal of the battery cell 103. The zener diode 159 supplies a reference voltage Vz to the operational amplifier 157. The minus (−) terminal of the operational amplifier 157 is connected to the drain of the MOS-FET 155. The output terminal of the operational amplifier 157 is connected to one end of a resistor 161, and the other end of the resistor 161 is connected to the gate of the MOS-FET 155.

Similar to the constant current circuit shown in FIG. 2, configured by the transistor 115, the constant current circuit 152 shown in FIG. 4, configured by the MOS-FET 155, is operated only when the surface temperature of the battery cells 103 to 105 is in the low temperature range. When the MPU 113 turns on the FET 151, the FET 153 is turned on, whereby the operation of the constant current circuit 152 is started. Assuming the resistance value of the current sense resistor Rs be Rs and the charging current flowing through the MOS-FET 155 be I, by selecting the resistance value of the current sense resistor Rs and the breakdown voltage of the zener diode 159 so as to satisfy the relationship of $IRs=Vz$, the gate voltage of the MOS-FET 155 is controlled such that the charging current has a constant value. It is to be noted that a junction-type FET may be used instead of the MOS-type FET. Although the MOS-FET 155 generates heat when it is operated in the continuous constant current mode rather than a switching manner, the heat is advantageously used in a manner similar to the constant current circuit 111 shown in FIG. 2.

The present invention can be applied to a battery pack in which a charging Current is required to be changed in accordance with the temperature of the battery cell. The present invention can be applied to a battery pack particularly useful in a shipped apparatus equipped with a battery charger which is operated with a single setting current.

While the particular BATTERY PACK AND CHARGING METHOD is herein shown and described in detail, it is to be understood that the subject matter which is encompassed by the present invention is limited only by the claims.

What is claimed is:

1. A battery pack configured to be charged with a charging current supplied by a DC power supply, comprising:
   a secondary battery;
   a temperature element configured to measure a temperature in connection with the secondary battery;
   a first charging circuit configured to generate a constant current from the charging current; and
   a control unit configured to control an operation of the battery pack in a manner such that the secondary battery is charged with the constant current lower than the charging current by means of the first charging circuit when it is determined that the temperature associated with the secondary battery belongs to a low temperature range, while the secondary battery is charged by means of the DC power supply when it is determined that the temperature associated with the secondary battery belongs to a nominal temperature range higher than the low temperature range.

2. The battery pack according to claim 1, further comprising a second charging circuit configured to generate a switching current from the charging current,
   wherein the control unit controls the operation of the battery pack in a manner such that the secondary battery is charged with the switching current smaller than the charging current by means of the second charging circuit when it is determined that the temperature associated with the secondary battery belongs to a high temperature range higher than the nominal temperature range.

3. The battery pack according to claim 1, wherein the first charging circuit comprises bipolar transistors.

4. The battery pack according to claim 1, wherein the first charging circuit comprises field-effect transistors.

5. The battery pack according to claim 2, wherein the second charging circuit comprises a charge protection switch that is arranged for preventing overvoltage charging to the secondary battery.

6. The battery pack according to claim 2, wherein the switching current has a peak value, which is equal to a value of the charging current.

7. The battery pack according to claim 1, wherein the secondary battery comprises a lithium ion battery.

8. A battery pack connectable to an apparatus equipped with a battery charger which operates with a single setting current in a constant-current/constant-voltage control mode, comprising:
 a secondary battery;
 a temperature element configured to measure a temperature in connection with the secondary battery;
 a constant current element configured to generate a constant current from a charging current supplied by the battery charger;
 a switch configured to generate a switching current from the charging current supplied by the battery charger; and
 a control unit configured to control an operation of the battery pack in a manner such that the secondary battery is charged with the constant current lower than the charging current by means of the constant current element when it is determined that the temperature in connection with the secondary battery belongs to a low temperature range, while the secondary battery is charged by means of the battery charger when it is determined that the temperature in connection with the secondary battery belongs to a nominal temperature range higher than the low temperature range, and the secondary battery is charged with the switching current lower than the charging current by means of the switch when it is determined that the temperature in connection with the secondary battery belongs to a high temperature range higher than the nominal temperature range.

9. The battery pack according to claim 8, wherein the control unit controls the operation of the battery pack in a manner such that when it is determined that the temperature in connection with the secondary battery belongs to the nominal temperature range during charging of the secondary battery by the constant current element or the switch, an operation of the constant current element or the switch is stopped, thereby allowing the secondary battery be charged by the battery charger.

10. The battery pack according to claim 8, wherein the control unit controls the operation of the battery pack in a manner such that when it is determined that a charging mode of the secondary battery enters a state in which it switches to a constant voltage control mode during charging of the secondary battery by the constant current element or the switch, the control unit stops the operation of the constant current element or the switch thereby allowing the secondary battery be charged in the constant voltage control mode by the battery charger.

11. The battery pack according to claim 8, wherein the control unit controls the operation of the battery pack in a manner such that when it is determined that the voltage of the secondary battery has reached an allowable maximum charging voltage that is allowed in the low temperature range or an allowable maximum charging voltage that is allowed in the high temperature range during charging of the secondary battery by the constant current element or the switch, the charging of the secondary battery is stopped.

12. The battery pack according to any one of claim 8, wherein the control unit controls the operation of the battery pack in a manner such that when it is determined that the temperature in connection with the secondary battery has reached the high temperature range during charging of the secondary battery in the constant current control mode by the battery charger, the secondary battery is charged by the switch.

13. A battery-driven apparatus, comprising:
 a battery charger which is operated with a single setting current in a constant-current/constant-voltage control mode;
 a battery pack configured to be charged with a charging current which is output by the battery charger; and
 a device configured to operate upon being supplied with electric power from the battery pack,
 wherein the battery pack includes:
 a secondary battery;
 a temperature element configured to measure a temperature in connection with the secondary battery;
 a constant current element configured to generate a constant current from a charging current supplied by the battery charger;
 a switch configured to generate a switching current from the charging current supplied by the battery charger; and
 a control unit configured to control an operation of the battery pack in a manner such that the secondary battery is charged with the constant current lower than the charging current by means of the constant current element when it is determined that the temperature in connection with the secondary battery belongs to a low temperature range, while the secondary battery is charged by means of the battery charger when it is determined that the temperature in connection with the secondary battery belongs to a nominal temperature range higher than the low temperature range, and the secondary battery is charged with the switching current lower than the charging current by means of the switch when it is determined that the temperature in connection with the secondary battery belongs to a high temperature range higher than the nominal temperature range.

14. A battery pack configured to be charged with a charging current supplied by a battery charger, comprising:
 a secondary battery;
 a temperature element configured to measure a temperature in connection with the secondary battery;
 a low-temperature charging circuit configured to generate a charging current lower than the charging current from the charging current;
 a high-temperature charging circuit configured to generate, from the charging current, a charging current lower than the charging current under heat generation less than that of the low-temperature charging circuit; and
 a control unit configured to control an operation of the battery pack in a manner such that the secondary battery is charged by the low-temperature charging circuit when it is determined that a temperature in connection with the secondary battery belongs to a low temperature range, while the secondary battery is charged by the battery charger when it is determined that the temperature in connection with the secondary battery belongs to a nominal temperature range higher than the low temperature range, and the secondary battery is charged by the high-temperature charging circuit when it is determined that the temperature in connection with the secondary battery belongs to a high temperature range higher than the nominal temperature range.

15. A charging method of a battery pack comprising a secondary battery, a constant current circuit configured to generate a constant current from a charging current supplied by a battery charger which is operated by a constant-current/constant-voltage control method, and a switch connected to a charging circuit through which the charging current flows, the method comprising the steps of:

supplying a charging current to the battery pack by the battery charger;

determining whether a temperature in connection with the secondary battery belongs to either a low temperature range, a nominal temperature range higher than the low temperature range, or a high temperature range higher than the nominal temperature range;

charging the secondary battery with a constant current lower than the charging current that the constant current circuit has generated from the charging current, when it is determined that the temperature in connection with the secondary battery belongs to the low temperature range;

charging the secondary battery by the battery charger when it is determined that the temperature in connection with the secondary battery belongs to the nominal temperature range; and charging the secondary battery with a switching current lower than the charging current that the switch has generated from the charging current, when it is determined that the temperature in connection with the secondary battery belongs to the high temperature range.

16. A method of charging a secondary battery accommodated in a battery pack based on the temperature associated with the secondary battery, the method comprising:

providing a battery charger outputting only a single first current in a constant-current/constant-voltage control mode;

deriving a second current from the battery charger, the second current being less than the first current; and using the second current to charge at least one battery when a temperature associated with the battery is below a threshold, and otherwise using the first current to charge the battery.

* * * * *